(12) United States Patent
Crossland et al.

(10) Patent No.: US 7,079,290 B2
(45) Date of Patent: Jul. 18, 2006

(54) HALFTONING METHOD AND SYSTEM PROVIDING INCREASED NUMBER OF DENSITIES PER BASIC HALFTONE CELL FOR CONSTANT INPUT

(75) Inventors: James Francis Crossland, Boulder, CO (US); Joan LaVerne Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 09/876,206

(22) Filed: Jun. 6, 2001

(65) Prior Publication Data

US 2002/0186414 A1 Dec. 12, 2002

(51) Int. Cl.
*H04N 1/405* (2006.01)

(52) U.S. Cl. .................. 358/3.13; 358/3.14; 358/3.16; 358/535

(58) Field of Classification Search ............... 358/3.13, 358/3.14, 3.15, 3.16, 3.17, 3.18, 3.19, 534, 358/535, 536
See application file for complete search history.

(56) References Cited

U.S. PATENT DOCUMENTS

| | | | | |
|---|---|---|---|---|
| 4,642,653 A | | 2/1987 | Ito et al. ........................ 346/1.1 |
| 4,672,432 A | * | 6/1987 | Sakurada et al. ............ 358/534 |
| 4,897,736 A | * | 1/1990 | Sugino ......................... 358/1.9 |
| 5,053,887 A | | 10/1991 | Thompson .................... 358/457 |
| 5,204,760 A | | 4/1993 | Murayama et al. .......... 358/456 |
| 5,253,084 A | | 10/1993 | Rylander ...................... 358/465 |
| 5,258,832 A | | 11/1993 | Rylander ...................... 358/527 |
| 5,463,471 A | | 10/1995 | Chou ........................... 358/298 |
| 5,469,515 A | | 11/1995 | Lin .............................. 382/237 |
| 5,526,438 A | | 6/1996 | Barton ......................... 382/237 |
| 5,761,325 A | | 6/1998 | Barton ......................... 382/100 |
| 5,805,305 A | * | 9/1998 | Abe ........................... 358/3.13 |
| 5,867,599 A | | 2/1999 | Michaelis et al. ........... 382/237 |

OTHER PUBLICATIONS

Using Pixel Overlap to Obtain More Gray Levels in Halftone Reproductions, Peter A. Torpey, Journal of Imaging Technology vol. 14, No. 2, Apr. 1988, pp. 25-28.
Partial Dot Overlap Method for Grey Scale Printing, IBM Technical Disclosure Bulletin, Feb. 1993, pp. 269-272.
Image Haltoning, IBM Technical Disclosure Bulletin, Sep. 1986.

* cited by examiner

*Primary Examiner*—Thomas D. Lee
(74) *Attorney, Agent, or Firm*—Dale M. Crockatt, Esq.; Kevin P. Radigan, Esq.; Heslin Rothenberg Farley & Mesiti, P.C.

(57) ABSTRACT

Apparatus and method for flexible digital halftoning are provided in which novel pattern choices are allowed by not restricting the basic halftone patterns to grow sequentially. Rather, positions in a threshold array allow multiple transitions between on (i.e., printed with toner/ink) and off (not printed) as a function of the input value at the corresponding position. In one embodiment, multiple threshold matrices are employed and the output decision is a vote (e.g., exclusive OR) of the outputs of the individual threshold matrices. In another embodiment, each position contains an arbitrary bit vector to express the output for each input. This flexibility in growing basic halftone patterns allows the number of densities output to be larger than n+1 (where "n" is the number of dots within a basic halftone cell).

23 Claims, 17 Drawing Sheets

| INPUT LEVEL | ROW 1 BIT VECTOR | ROW 2 BIT VECTOR | ROW 3 BIT VECTOR | ROW 4 BIT VECTOR |
|---|---|---|---|---|
| 0 | 0000 | 0000 | 0000 | 0000 |
| 1 | 0000 | 0100 | 0000 | 0000 |
| 2 | 0000 | 0100 | 0100 | 0000 |
| 3 | 0000 | 0100 | 0100 | 0100 |
| 4 | 0000 | 0110 | 0110 | 0000 |
| 5 | 0100 | 1110 | 0100 | 0000 |
| 6 | 0110 | 0110 | 0110 | 0000 |
| 7 | 0110 | 1110 | 0110 | 0000 |
| 8 | 0110 | 1111 | 0110 | 0000 |
| 9 | 1110 | 1110 | 1110 | 0000 |
| 10 | 0100 | 1111 | 1111 | 0100 |
| 11 | 1110 | 1110 | 1110 | 1100 |
| 12 | 1110 | 1110 | 1110 | 1110 |
| 13 | 1110 | 1110 | 1110 | 1111 |
| 14 | 1110 | 1110 | 1111 | 1111 |
| 15 | 1110 | 1111 | 1111 | 1111 |
| 16 | 1111 | 1111 | 1111 | 1111 |

*fig. 10A*

| INPUT LEVEL | ROW1.ROW1 | ROW2.ROW2 | ROW3.ROW3 | ROW4.ROW4 |
|---|---|---|---|---|
| 0 | 0000. 0000 | 0000. 0000 | 0000. 0000 | 0000. 0000 |
| 1 | 0000. 0000 | 0100. 0100 | 0000. 0000 | 0000. 0000 |
| 2 | 0000. 0000 | 0100. 0100 | 0100. 0100 | 0000. 0000 |
| 3 | 0000. 0000 | 0100. 0100 | 0100. 0100 | 0100. 0100 |
| 4 | 0000. 0000 | 0110. 0110 | 0110. 0110 | 0000. 0000 |
| 5 | 0100. 0100 | 1110. 1110 | 0100. 0100 | 0000. 0000 |
| 6 | 0110. 0110 | 0110. 0110 | 0110. 0110 | 0000. 0000 |
| 7 | 0110. 0110 | 1110. 1110 | 0110. 0110 | 0000. 0000 |
| 8 | 0110. 0110 | 1111. 1111 | 0110. 0110 | 0000. 0000 |
| 9 | 1110. 1110 | 1110. 1110 | 1110. 1110 | 0000. 0000 |
| 10 | 0100. 0100 | 1111. 1111 | 1111. 1111 | 0100. 0100 |
| 11 | 1110. 1110 | 1110. 1110 | 1110. 1110 | 1100. 1100 |
| 12 | 1110. 1110 | 1110. 1110 | 1110. 1110 | 1110. 1110 |
| 13 | 1110. 1110 | 1110. 1110 | 1110. 1110 | 1111. 1111 |
| 14 | 1110. 1110 | 1110. 1110 | 1111. 1111 | 1111. 1111 |
| 15 | 1110. 1110 | 1111. 1111 | 1111. 1111 | 1111. 1111 |
| 16 | 1111. 1111 | 1111. 1111 | 1111. 1111 | 1111. 1111 |

*fig. 10B*

|   |   |   |
|---|---|---|
| R,C | INPUT LEVEL | ARRAY OF BYTES |
| 2,3 | 0 | 00000000 |
| 2,3 | 1 | 00000000 |
| 2,3 | 2 | 00000000 |
| 2,3 | 3 | 00000000 |
| 2,3 | 4 | 00000001 |
| 2,3 | 5 | 00000001 |
| 2,3 | 6 | 00000001 |
| 2,3 | 7 | 00000001 |
| 2,3 | 8 | 00000001 |
| 2,3 | 9 | 00000001 |
| 2,3 | 10 | 00000001 |
| 2,3 | 11 | 00000001 |
| 2,3 | 12 | 00000001 |
| 2,3 | 13 | 00000001 |
| 2,3 | 14 | 00000001 |
| 2,3 | 15 | 00000001 |
| 2,3 | 16 | 00000001 |

|   |   |   |
|---|---|---|
| R,C | INPUT LEVEL | ARRAY OF BYTES |
| 2,4 | 0 | 00000000 |
| 2,4 | 1 | 00000000 |
| 2,4 | 2 | 00000000 |
| 2,4 | 3 | 00000000 |
| 2,4 | 4 | 00000000 |
| 2,4 | 5 | 00000000 |
| 2,4 | 6 | 00000000 |
| 2,4 | 7 | 00000000 |
| 2,4 | 8 | 00000001 |
| 2,4 | 9 | 00000000 |
| 2,4 | 10 | 00000001 |
| 2,4 | 11 | 00000000 |
| 2,4 | 12 | 00000000 |
| 2,4 | 13 | 00000000 |
| 2,4 | 14 | 00000000 |
| 2,4 | 15 | 00000001 |
| 2,4 | 16 | 00000001 | fig. 11B

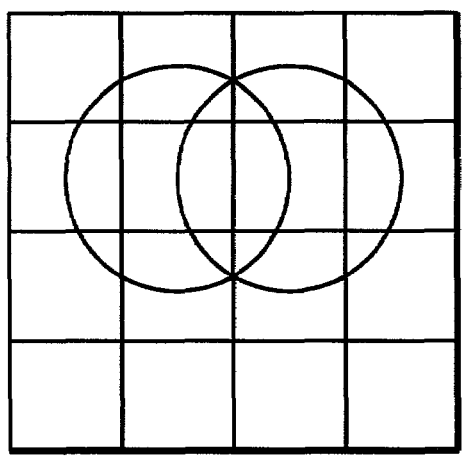 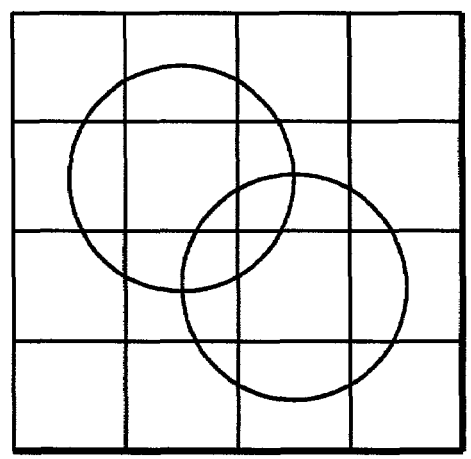
ADJACENT PELS    DIAGONAL PELS
*fig. 13*

HALFTONING METHOD AND SYSTEM PROVIDING INCREASED NUMBER OF DENSITIES PER BASIC HALFTONE CELL FOR CONSTANT INPUT

CROSS-REFERENCE TO RELATED APPLICATION

This application contains subject matter which is related to the subject matter of a co-pending, commonly assigned U.S. patent application entitled "Flexible Digital Halftoning", Ser. No. 09/713,985, filed Nov. 16, 2000, which is hereby incorporated herein by reference in its entirety.

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present invention relates generally to the field of digital halftoning. More particularly, the invention relates to a method and apparatus for digital halftoning that provides flexibility in terms of pattern choices by enabling a position in the threshold matrix to make multiple transitions between on (e.g., printed with toner/ink, possibly with multiple intermediate levels) and off (e.g., not printed), thereby allowing for a number of densities (for example) that is larger than n+1 (where "n" is the number of possible dots within a basic halftone cell).

BACKGROUND OF THE INVENTION

Image processing apparatus and processes are evaluated in part, for example, by their capability of delivering a complete gray scale at normal viewing distances. This capability is to a certain extent based upon the halftoning techniques employed. Halftoning is a widely used mechanism for converting input intensities represented with multiple bits of information, K (usually K=8) into bilevel or multilevel picture elements ("pels") with L bits, where L<K. The goal in bilevel halftoning continuous-tone images or multilevel computer generated graphics is to give an illusion of the many shades contained in the original or interpolated multi-bit values per component sample while using only one bit per output sample. Multilevel halftoning allows more than bit per output sample. One traditional technique for halftoning is to create a threshold matrix (usually a different one for each color component) and use it to select a threshold value per sample. The threshold matrix is generally of much smaller dimensions than the image. Halftoning is accomplished by progressing through the input line and the threshold matrix simultaneously, comparing each input intensity with the corresponding threshold value in the threshold matrix. For binary halftoning, if the input intensity is greater than or equal to the threshold value, a fully saturated (e.g. black) corresponding output pel is generated, otherwise the corresponding output pel is white (e.g. Nothing printed). For multilevel halftoning, if the input is within some range of the threshold value, the corresponding output intensity may be an intermediate value. For each line in the image, a given threshold matrix row is cycled through repetitively. The next row is used for the next line. After the last row in the threshold matrix is used, the top row of the threshold matrix is used again.

These threshold matrices are generally referred to as "supercells." An exemplary supercell and its relationship to basic cells are discussed briefly with reference to FIGS. 1A and 1B. FIG. 1A illustrates the structure of a basic cell 100. In FIG. 1A, the basic cell 100 comprises a 4×4 pel matrix. As described further below, at present, element positions within the basic cell structure 100 are manipulated in a sequential manner (as indicated by the numbers within the elements) to achieve output densities. Incrementing from one output density to the next is accomplished by preserving the current pattern represented by the elements of the basic cell structure 100 and turning on one additional element.

FIG. 1B illustrates an exemplary supercell that is made up of much smaller basic cells such as that depicted in FIG. 1A. The four quadrants of the supercell are labeled to show the order in which the basic cells are filled. In this example, the supercell 150 comprises four basic cells 151–154. The basic cells 151–154 set the halftone's lines per inch thereby determining the level of detail that may be preserved while the size of the supercell 150 determines the number of shades obtainable. According to the current state of the art, a single halftone threshold matrix is used to convert continuous-tone images and graphics into binary or multilevel images. The density of the pels in a region is indicative of the original values in that region, for constant input intensity.

FIG. 1C illustrates using four basic cells to achieve 64 levels by incrementally filling the basic cells in accordance with the ordering of FIG. 1B. If the input image only had 65 levels, i.e., 0 to 64, then FIG. 1C could represent a traditional threshold matrix. Each element contains the comparison, i.e., threshold, value used to determined whether to print the corresponding position in the input image or not. For purposes of this application, the convention of the input value being greater than or equal to the comparison value is employed for the output to be a one (e.g., printed). Of course, this convention is arbitrary and other conventions may be employed. For example, an alternative convention would be to enable (e.g., print) the output pel when the input value is less than or equal to the threshold value.

As illustrated by the prior art basic cell pattern growth example of FIG. 2, N×M+1 output densities may be represented with an N×M halftone matrix for constant input intensities. For example, a 4×4 basic cell halftone matrix allows the generation of 17 densities, i.e., white 201 plus 16 other levels 202–217, to be achieved by turning one and only one element on for each subsequent density. Currently, subsequent densities are generated based upon previous densities by turning one and only one additional element on, thereby requiring patterns for each subsequent density to be a superset of those patterns corresponding to preceding densities For example, once element 220 of the pattern is turned on, it remains on for the rest of the basic patterns. As a result, the number of densities is limited to N×M+1 for constant input intensities. With non-constant input intensities, image detail can cause the output to vary from these basic patterns.

One technique for increasing the number of gray levels (i.e. densities) in halftone reproductions is described by Peter A. Torpey in an article entitled "Using Pixel Overlap to Obtain More Gray Levels in Halftone Reproductions", Journal of Imaging Technology, Volume 14, Number 2, April 1998. As the title indicates, this method employs pixel (i.e., dot or spot) overlap in any display process where the printed dots are larger than the pixel spacing. In such processes, two pixels, for example, may be printed as neighbors so that they overlap, or far apart, so that they do not overlap. The overlapping pixels will cover less area on the paper and appear lighter than the non-overlapping pixels.

Another approach to increasing the number of densities in a halftone reproduction is described in U.S. Pat. No. 5,867,599 by Michaelis et al., entitled "Screenings of Continuous Tone Images Utilizing Physical Interactions of Adjacent Pixels". This patent describes a technique for converting continuous tone values to output values while controlling adjacency affects by implementing a lookup table which represents the continuous tone values as addresses in order to provide output patterns to a marking device. The output patterns, when rendered, have substantially the same densities as the corresponding continuous tone values.

Both of the above-referenced techniques have certain disadvantages. For example, the Torpey approach requires an input that is much smaller than the output (e.g. 16:1) and/or employs significant calculating using neighboring pel information (i.e., partial dotting). The Michaelis et al. patent achieves an increased number of densities in halftone reproduction by either indexing the closest (measured) N×M output for a given input (i.e., employs multiple output pels for one input pel ), or uses neighboring output pels in addition to the input intensity to select among tables. In view of the above disadvantages, both approaches are difficult to implement in parallel hardware.

Thus, a need continues to exist in the art for an enhanced technique for providing an increased number of densities for halftone reproduction, and in particular one which employs a point-wise use of multiple threshold matrices with no interaction from neighboring input or output intensities to accomplish the provision of extra densities. The present invention is directed to meeting this need.

SUMMARY OF THE INVENTION

A method, system and machine-readable medium are described for implementing an increased number of densities per basic halftone cell for constant input. According to one embodiment, a method of halftoning is provided which includes: receiving input data comprising a first plurality of pels having a first plurality of intensities, wherein the first plurality of intensities (Iin) are chosen from K intensity levels; converting the first plurality of pels having the first plurality of intensities into a second plurality of pels having a second plurality of intensities, wherein the second plurality of intensities (Iout) are chosen from L intensity levels, where L<K; wherein at least some pels of the second plurality of pels are grouped into at least one basic cell, each basic cell comprising n pels of the second plurality of pels; and wherein a maximum number of densities per each basic cell is greater than $(1+n \times (L-1))$ for a constant input intensity (Iin), and each intensity out (Iout) is chosen without reference to an intensity out of a neighboring pel and multiple pels of the first plurality of pels contribute to the density of each basic cell.

According to another embodiment, a method of halftoning is provided which includes: allowing different placements of a same number of output dots within a basic cell to create different average densities for the basic cell, wherein adjacent output dots overlap within the basic cell, and wherein for a constant input intensity of input data and a given number of pels (n) per basic cell a number of average densities per basic cell is greater than $(1+n \times (L-1))$, where L is a number of intensity levels from which an output intensity (Iout) of each pel of the basic cell is chosen; and wherein each intensity out (Iout) is chosen without reference to an output intensity of a neighboring pel, and multiple input pels of the input data contribute to the average density of each basic cell.

According to yet further aspects of the present invention, halftoning systems and machine-readable media implementing the above-summarized halftoning methods are also provided and claimed herein.

Other features of the present invention will be apparent from the accompanying drawings and from the detailed description that follows.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIG. 10A illustrates a table of bit-vectors for creating the basic patterns of FIG. 7 according to one embodiment of the present invention.

FIG. 10B illustrates an output optimization of FIG. 10A according to one embodiment of the present invention in which one access yields 8 pels of output assuming constant input values.

FIGS. 11A and 11B illustrate a table organized for more efficient output pel retrieval according to one embodiment of the present invention.

FIG. 13 illustrates two examples of dot overlap in an exemplary basic cell showing (in one example) overlapping dots corresponding to horizontally adjacent pels and (in another example) overlapping dots corresponding to diagonally adjacent pels.

BEST MODE FOR CARRYING OUT THE INVENTION

Figure 1:
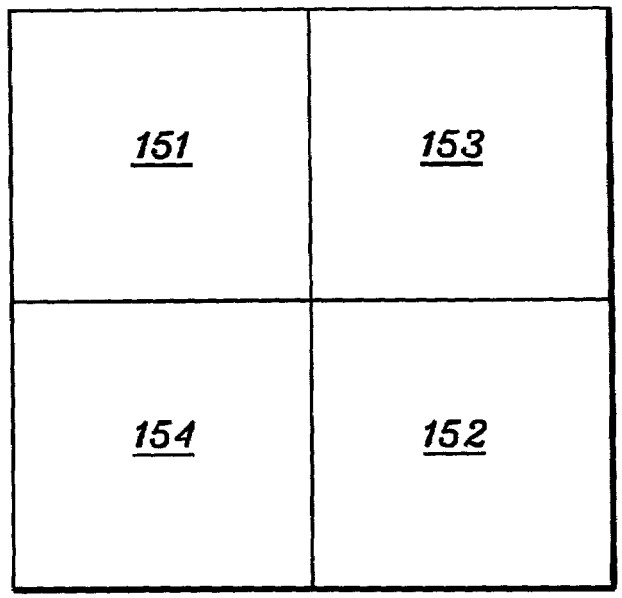
FIG. 1A illustrates an exemplary basic cell.
FIG. 1B illustrates an exemplary supercell.
FIG. 1C illustrates the use of four basic cells within the supercell structure of FIG. 1B to achieve 65 output levels.
Figure 2:
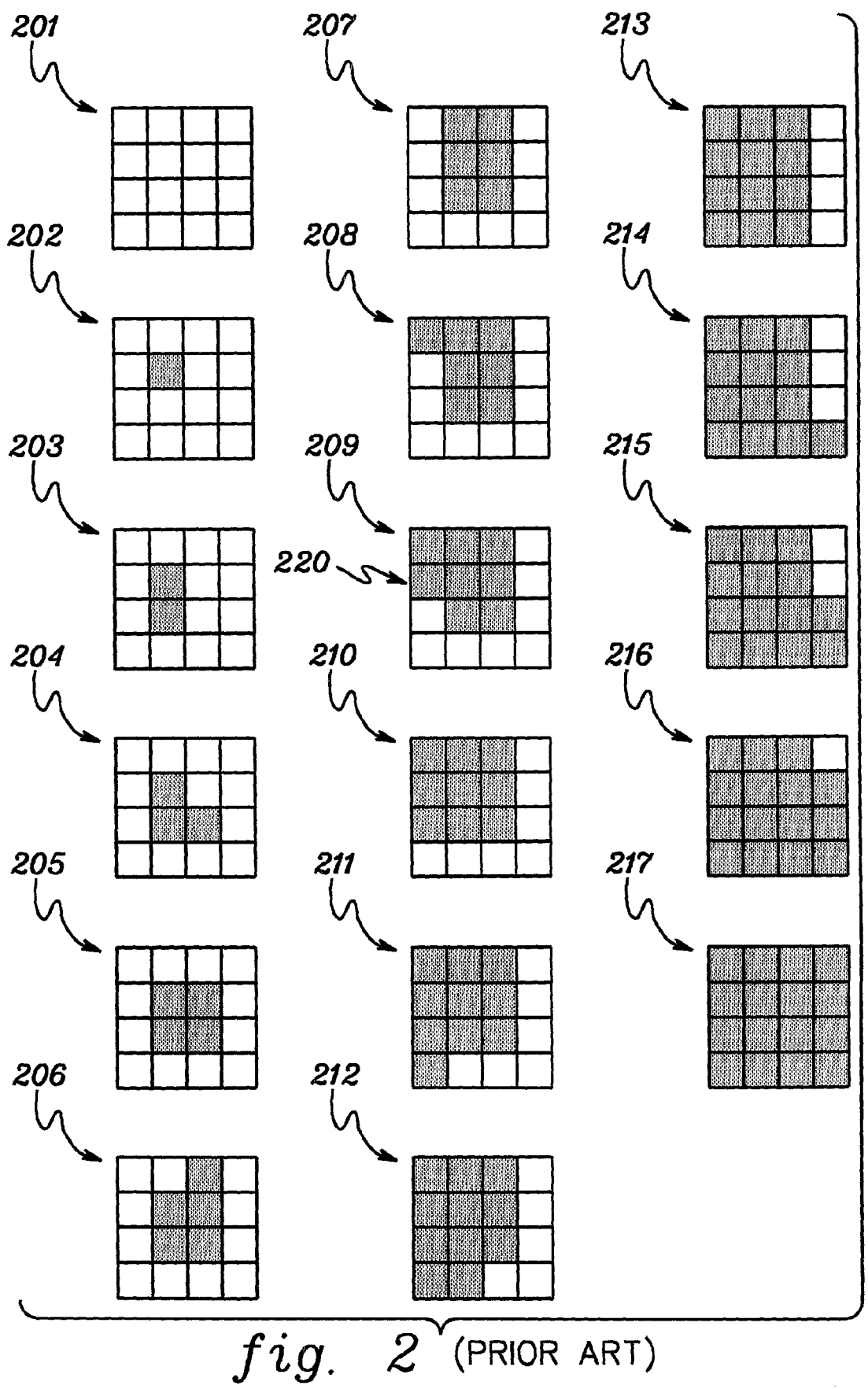
FIG. 2 illustrates exemplary prior art basic cell pattern growth.

A method and apparatus are described for implementing flexible digital halftoning. Broadly stated, embodiments of the present invention seek to solve or at least alleviate the above-referenced problems of conventional halftoning approaches by employing a thresholding mechanism that allows flexibility in terms of pattern choices. For example, according to one embodiment, rather than being constrained to a superset of those patterns corresponding to lower density patterns, one or more positions in a threshold matrix may make multiple transitions between on (e.g., printed with toner/ink) and off (e.g., not printed). Advantageously, this novel halftoning approach allows bad patterns, such as those that produce visual artifacts and/or undesirable textures or are otherwise visually displeasing, to be avoided in basic cell pattern growth. In another aspect, this novel halftoning approach advantageously allows for, for example, a number of densities that is larger than n+1 (where "n" is the number of possible dots within a basic halftone cell).

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

For convenience, embodiments of the present invention will be described with reference to a 3×3 basic cell or an 8×8 supercell comprising four 4×4 basic cells. However, the present invention is not limited to any particular representation of the threshold matrix. In addition, while some embodiments of the present invention are described with reference to a bilevel printer, aspects of the present invention are equally applicable to other types of output devices as well, such as multilevel printers, monochrome and color display devices, and the like.

In addition, the concepts disclosed herein can e applied as one example to the IBM InfoPrint Color 130 Plus printer which prints fourteen intermediate values plus a fully saturated value (i.e. 4-bits per output) per color component. This printer uses a threshold matrix to determine when to allow printing. Input values less than the threshold value are forced to zero (i.e., printing off). The input value minus the threshold value is used to index a downloadable table for all input values greater than or equal to the threshold value. This table could contain a ramp of increasing intermediate values and finish with the fully saturated value.

Terminology

Before describing an illustrative printing environment in which various embodiments of the present invention may be implemented, brief definitions of terms used throughout this application are given below.

"Halftoning" is a widely used mechanism for converting input intensities represented with multiple bits of information (usually 8 bits) into bilevel or multilevel (e.g. 4 bits) pels to give the illusion of continuous tones. For color images, each color component is usually halftoned separately as if it were a monochrome image. For the purposes of this specification, the examples are given for pixels (or samples) with only one component. Those skilled in the art will understand how to extend the concepts to multi-component images.

A "threshold matrix" is a conventional data structure used in connection with halftoning. Traditionally, a threshold matrix is represented as a two dimensional (2D) array of threshold values. The threshold values determine the input level for which the output (e.g., a bilevel pel) transitions from the off output state.

As used herein, a "threshold array" generally refers to a data structure that is conceptually tiled, both horizontally and vertically, to cover an input image thereby defining a pel output level for each input sample of the input image. In one embodiment, the threshold array may be an array of threshold matrices. The maximum number of transitions for any position determines the number of matrices needed whose outputs are voted (e.g., exclusive ORed to determine the appropriate output level). For example, three traditional threshold matrices may be used in combination to allow any given position to be turned on and then off before remaining on. In another embodiment, the threshold array may be conceptually thought of as a three dimensional (3D) array indexed by u, v, and input intensity; where u, and v are the x and y position in the input image modulo N and M (the dimensions of the supercell or the basic cell).

For multilevel (per component) printers the threshold array can be used to specify a gradual change (i.e., a ramp) from off (no printing) to fully saturated on and then another gradual change from on to off. In this case, the output is multi-bit rather than one bit. When the threshold array is composed of multiple threshold matrices, the first matrix could initiate a ramp of increasing intensities. The next matrix could initiate a ramp of decreasing intensities and so on.

"Pel" is a picture element. As used herein, an image is a set of mathematical abstract grids of pels. A monochrome image is composed of one mathematical abstract grid of pels. A color image is a set of mathematical abstract grids of pels, containing one grid per color component.

"Intensity" is a mathematical number that represents the value of a pel, with "0" defining a pel as "off".

"Basic cell" is an arrangement of pels, for example, a 3×3 or 4×4 array of pels.

"Dot" is the output at a pel that is different than the off state.

As used herein, "density" means the output averaged over the basic cell. The density resulting from a particular basic cell pattern can be measured, for example, by a densitometer when the input is such that each basic cell, in the area measured by the densitometer, has the particular basic cell pattern. Density is determined by the number and relative overlap of dots within the basic cell.

"Voting" is any process of reducing more than one result, input or output to a single result, input or output. The "Exclusive OR" function is one example of such a process.

Exemplary Printing Environment

Figure 3:
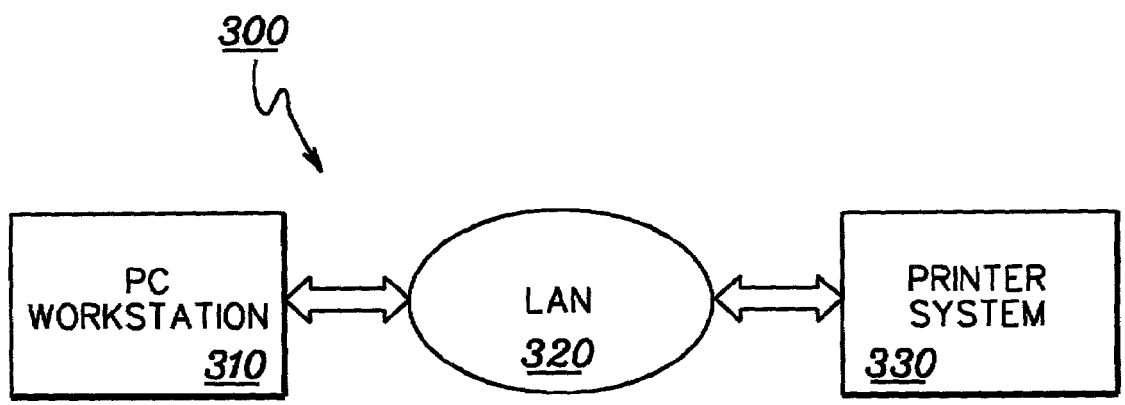
FIG. 3 is a simplified block diagram depicting a local area network (LAN) printing environment.
Figure 4:
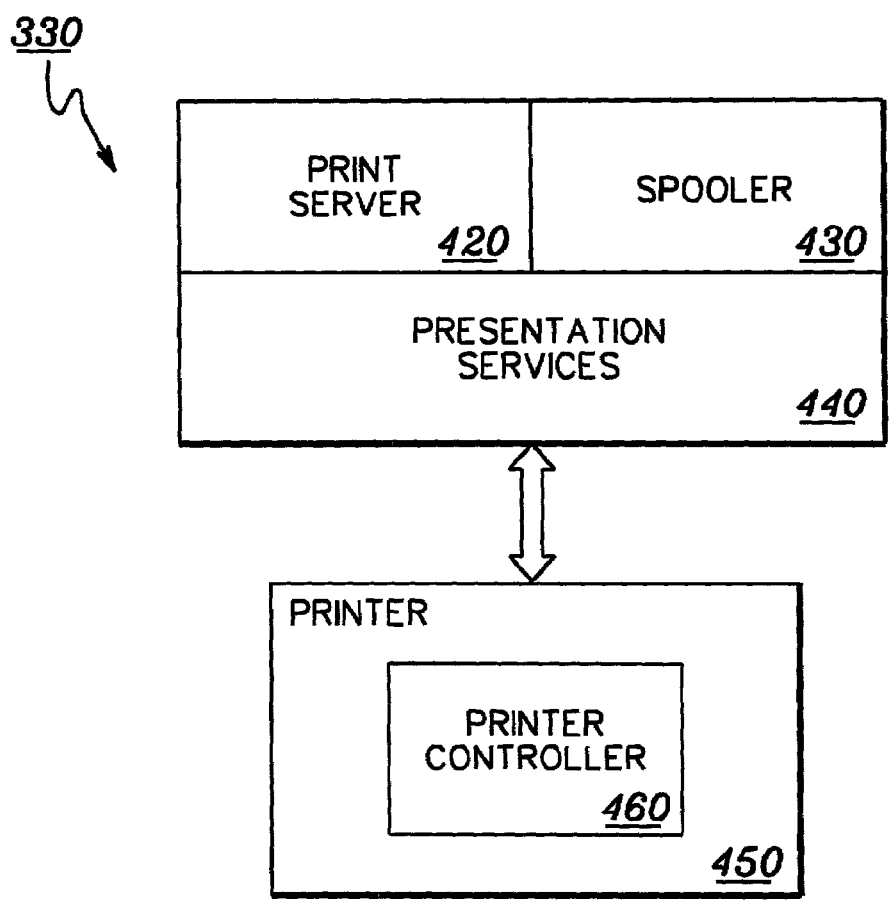
FIG. 4 illustrates a more detailed block diagram of a printer system according to one embodiment of the present invention.

A simplified printing environment 300 will briefly be described with reference to FIGS. 3 and 4. In this example, a personal computer workstation 310 is coupled to a printer system 330 via a LAN 320. According to one embodiment, the printer system 330 includes a spooler 430 for controlling the spooling of data files and presentation services 440 for generating appropriate commands to drive an attached printer 450. The printer system 330 may also include other components that are not shown for performing basic tasks, such as monitoring and configuring attached printers, and providing print job management. At any rate, when the PC workstation 310 has data to print, it sends print data to the print server 420. Among the functions typically provided by the print server 420 is the conversion of the data stream containing the print data to a data stream supported by the printer 450 to which the print data is destined. For instance, the printer 450 may accept the Intelligent Printer Data Stream (IPDS), PostScript, or some other printer data stream. As a result, the printer system 330 may also include a means for converting between the various input data streams that may be received and the data streams accepted by the printer 450. The print server 420 may also be configured to perform digital halftoning to allow a halftone image representation of an input image to be output by the printer 450. Alternatively, the novel, flexible, halftoning processing described herein may be performed local to the printer 450, e.g., by the printer controller 460.

An Exemplary Computer Architecture

Figure 5:
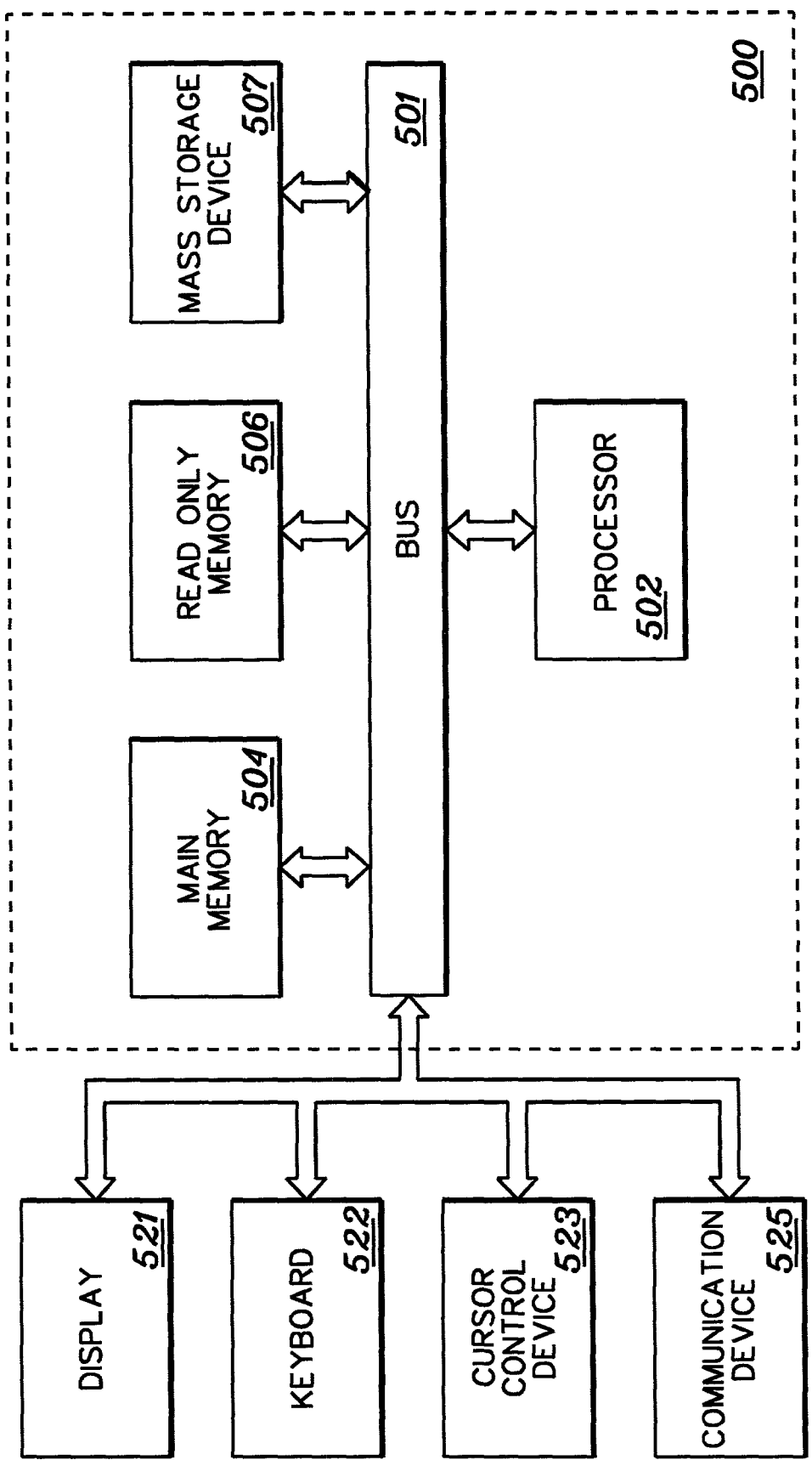
FIG. 5 illustrates a device in the form of a computer system in which features of the present invention may be implemented.

Having briefly described an exemplary environment in which the present invention may be employed, an exemplary machine in the form of a computer system 500 in which features of the present invention may be implemented will now be described with reference to FIG. 5. Computer system 500 may represent a workstation, host, server, print server, or printer controller. Computer system 500 comprises a bus or other communication means 501 for communicating information, and a processing means such as processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502.

A data storage device 507 such as a magnetic disk or optical disc and its corresponding drive may also be coupled to bus 501 for storing information and instructions. Computer system 500 can also be coupled via bus 501 to a display device 521, such as a cathode ray tube (CRT) or Liquid Crystal Display (LCD), for displaying information to an end user. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A communication device 525 is also coupled to bus 501. Depending upon the particular presentation environment implementation, the communication device 525 may include a modem, a network interface card, or other well-known interface devices, such as those used for coupling to Ethernet, token ring, or other types of physical attachment for purposes of providing a communication link to support a local or wide area network, for example. In any event, in this manner, the computer system 500 may be coupled to a number of clients and/or servers via a conventional network infrastructure, such as a company's Intranet and/or the Internet, for example.

The present invention is related to the use of computer system 500 to direct the execution of one or more software and/or firmware routines to perform halftoning via multiple threshold arrays or via a table lookup as discussed herein. As computer system 500 executes the one or more routines, the processor 502 may access an input image stored within main memory 504, ROM 506, or another storage device to manipulate the input image in accordance with desired presentation attributes. Importantly, the present invention is not limited to having all of the routines located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 500 will vary from implementation to implementation depending upon numerous factors, such as price constraints, performance requirements, and/or other circumstances. For example, according to one embodiment of the present invention, an embedded printer controller may comprise only a processor and a memory for storing static or dynamically loaded instructions and/or data.

An Exemplary Halftoning System

Figure 6:
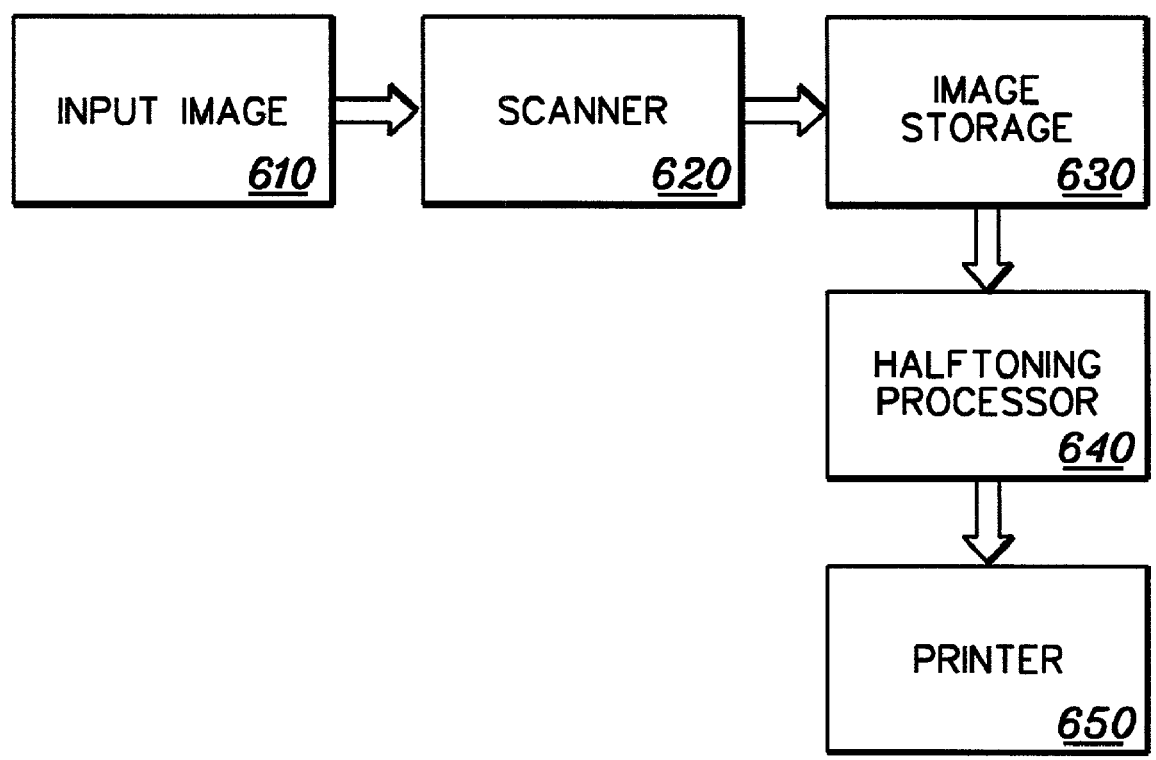
FIG. 6 is a block diagram of a halftoning system according to one embodiment of the present invention.

FIG. 6 illustrates a block diagram of a halftoning system according to one embodiment of the present invention. In this example, an input image 610 is scanned by a scanner 620 and stored in image storage 630. A halftoning processor 640 processes the stored image, if needed, to match the spatial sample frequency of the stored image to the spatial frequency of the printer's pels. Halftoning processor 640 then processes this modified image by using a novel threshold array to determine whether a pel from the input image will be printed as a dot as discussed further below. The output of the halftoning processor 640 is input to the printer 650.

Basic Cell Pattern Growth

Figure 7:
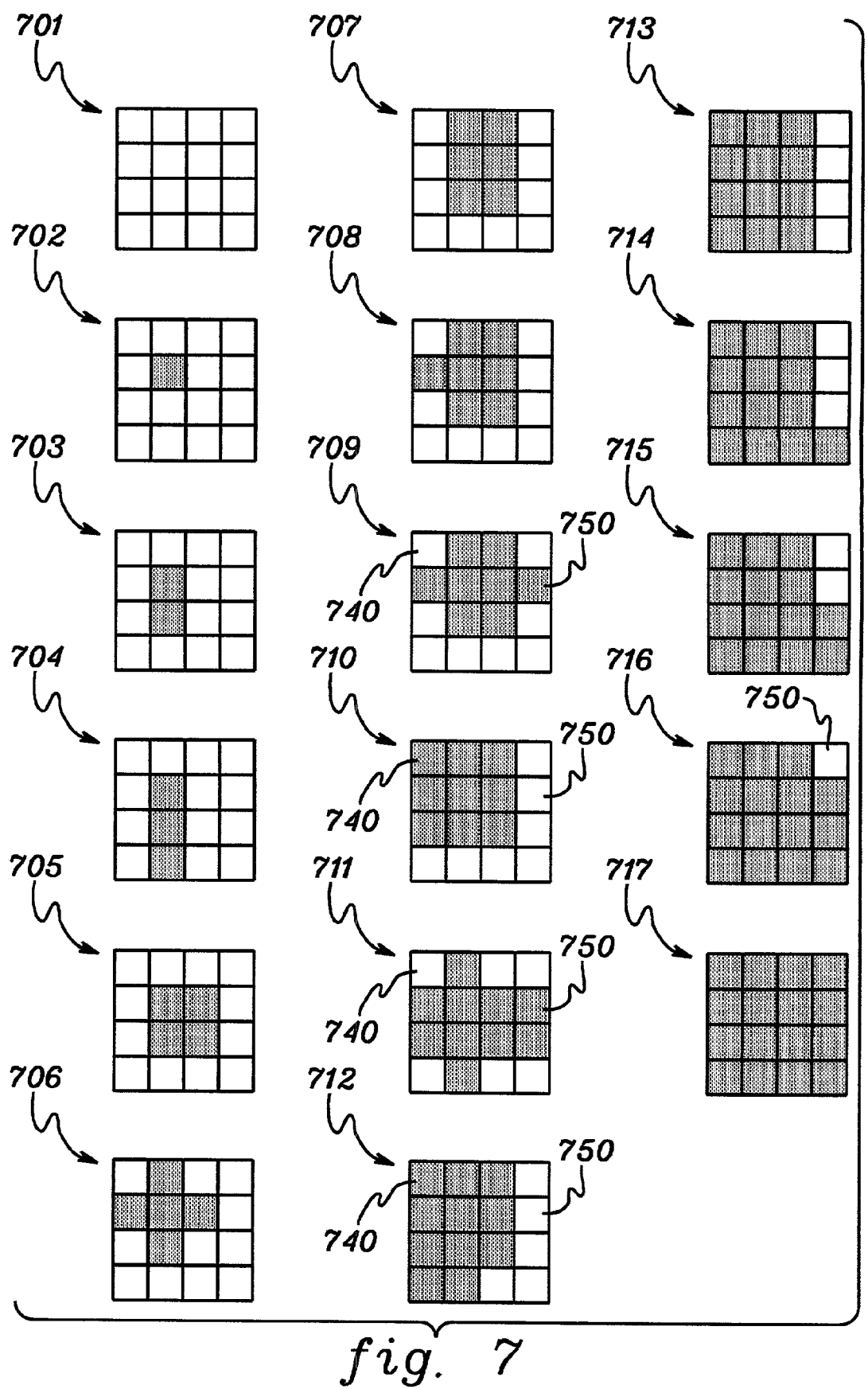
FIG. 7 illustrates a basic cell pattern growth example according to one embodiment of the present invention.

Referring now to FIG. 7, a basic cell pattern growth example according to one embodiment of the present invention will be described. As in the previous example, a 4×4 halftone matrix allows 17 output densities to be generated, i.e., white 701 and 16 other densities 702–717. Importantly, however, in this example, elements of the basic pattern may make multiple transitions between on and off. For example, element 740 in the upper left transitions from the off state in basic pattern 709 to the on state in basic pattern 710, back to off in basic pattern 711, and on to stay in basic pattern 712. Advantageously, in this manner, more flexibility in terms of pattern choices is provided, and if desired, more densities for a given number of pels in the "on" state (not shown) can be allowed.

Halftoning via Multiple Threshold Arrays

Figure 8A:
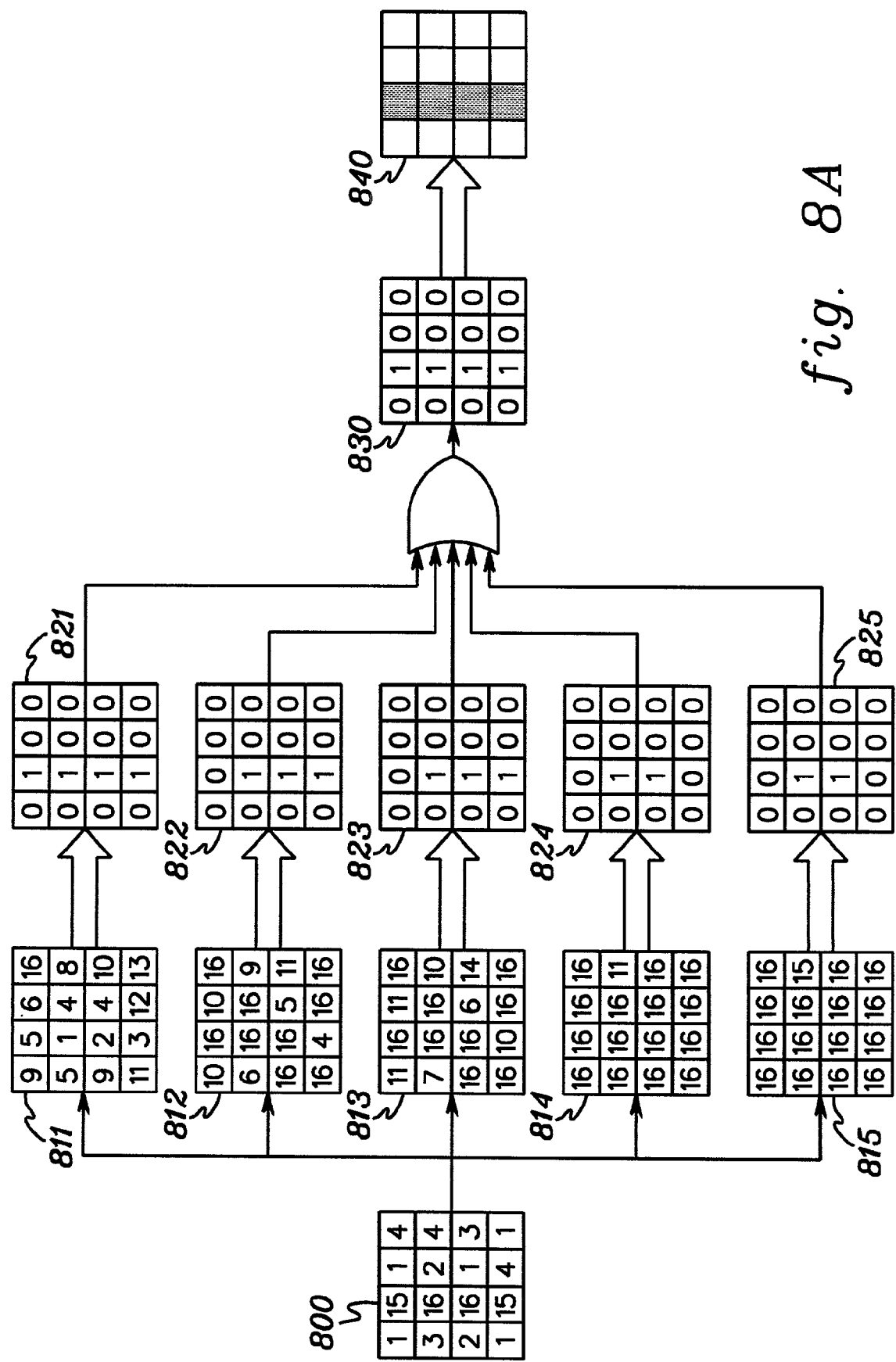
FIG. 8A conceptually illustrates how multiple threshold matrices are employed according to one embodiment of the present invention.

FIG. 8A illustrates an example of using multiple threshold matrices to allow basic cell patterns to be built by other than subsets of each other. The number of threshold matrices is set by the maximum number of transitions for any particular position in the basic cell. The five threshold matrices illustrated in FIG. 8A have been derived based upon the patterns of FIG. 7. The convention used by this example is if the input value is less than the threshold at a given position, then a zero is output; otherwise a one is output. In this example, the five transitions experienced by element 750 in the second row, fourth column dictate the number of matrices needed. If the input image is smaller than the output image, the halftoning processor 640 may first scale it (e.g., interpolate it) to the appropriate size.

At any rate, a 4×4 sample 800 from an input image is input to threshold matrices 811–815. The resulting patterns 821–825, respectively, are subsequently combined via an exclusive OR operation, for example, to produce a final pattern 830 which is used to cause the output device (e.g., a bilevel printer) to appropriately deposit ink or toner as shown by output pattern 840. The output pels are shown without overlap for purposes of illustration.

While there are a very large number of possible combinations of threshold matrices, in this example, the convention has been adopted that the first time a position has non-zero output is in the top matrix, the next matrix down turns it off, it is turned on again in the third, and so on. Additionally, while in practice the dynamic range of the input data is usually from 0 to 255 and is thresholded with much larger cells, e.g., supercells, for convenience, the dynamic range of the input image in this example is limited to between 0 and 16, inclusive.

Figure 8B:
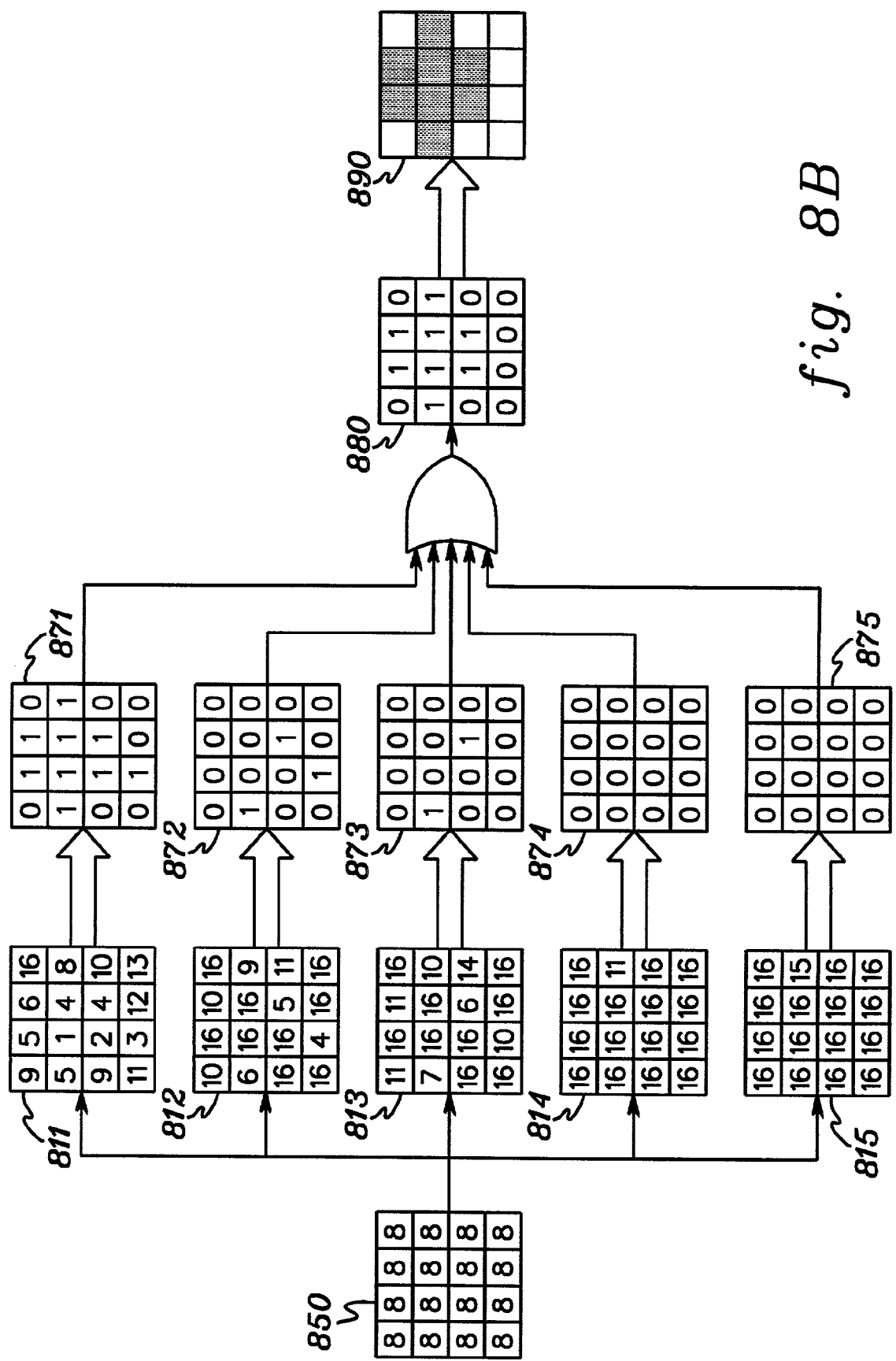
FIG. 8B illustrates a special case of FIG. 8A in which the input matrix is constant.

FIG. 8B illustrates a special case of FIG. 8A in which the input matrix 850 is constant. In this example, because the 4×4 sample 850 has constant input, the output 890 matches the ninth pattern 709 shown in FIG. 7. As above, each threshold matrix 811–815 is applied to the sample 850 to create a binary output 871–875. These outputs 871–875 are then XORed to generate the output image (illustrated both as a binary image 880 and as black and white pels 890).

Figure 9:
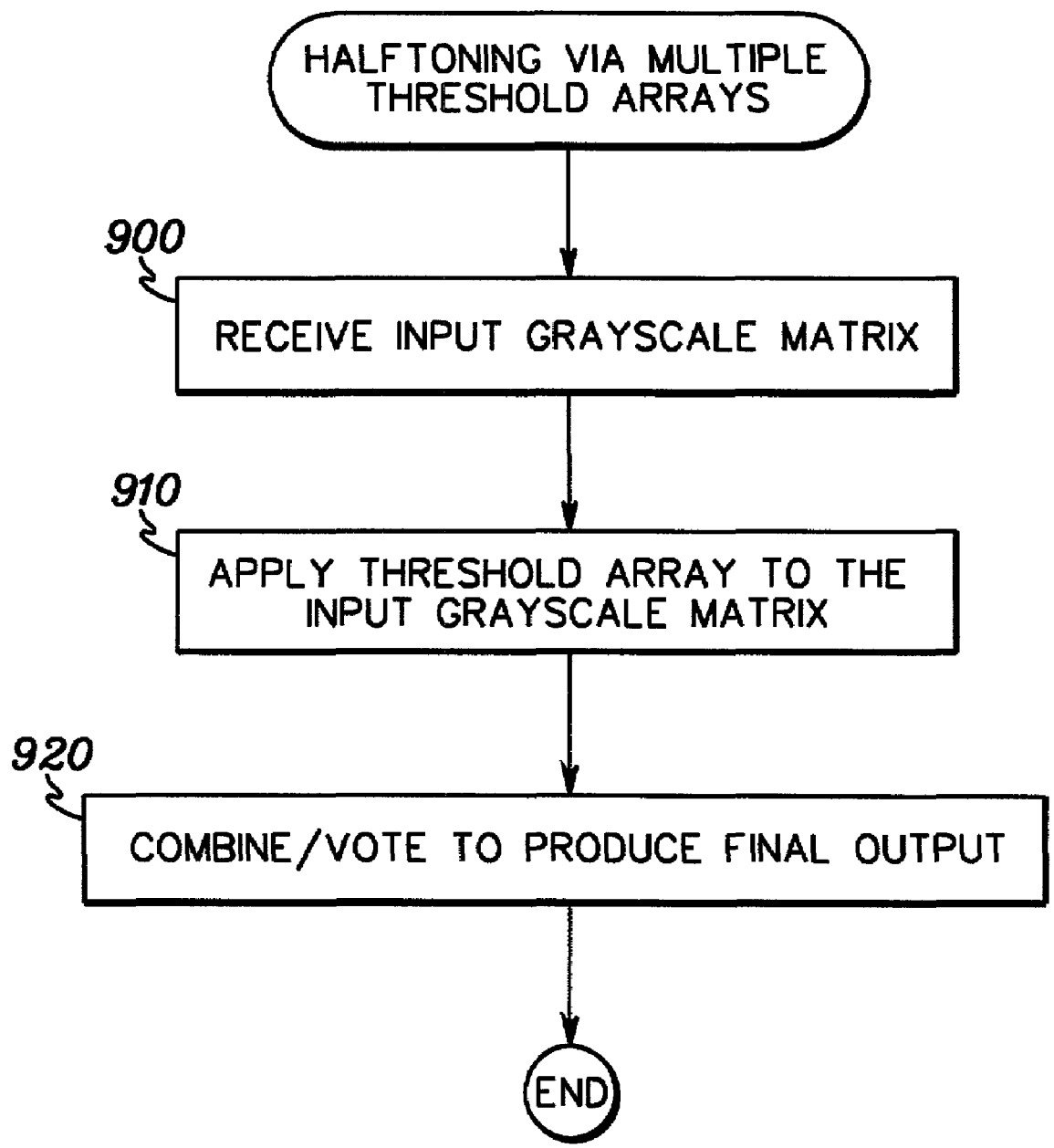
FIG. 9 is a flow diagram illustrating halftoning processing using multiple threshold arrays according to one embodiment of the present invention.

FIG. 9 is a flow diagram illustrating halftoning processing using multiple threshold arrays according to one embodiment of the present invention. In one embodiment, the processing blocks described below may be performed under the control of a programmed processor, such as processor 502. However, in alternative embodiments, the processing blocks may be fully or partially implemented by any programmable or hardcoded logic, such as Field Programmable Gate Arrays (FPGAs), TTL logic, or Application Specific Integrated Circuits (ASICs), for example.

At processing block 900, an input image, such as 4×4 sample 800, is received. At processing block 910, a threshold array (e.g., threshold matrices 811–815) is applied to the input image producing intermediate outputs (e.g., binary outputs 821–825). Finally, the intermediate outputs are voted (e.g., combined by an exclusive OR) in block 920 to produce the final output (e.g., binary image 830).

Halftoning via Table Look

FIG. 10A illustrates a table of bit-vectors for creating the basic patterns of FIG. 7 according to one embodiment of the present invention. In this example, each index accesses sixteen bits representing a 4×4 pattern of FIG. 7. A constant input level of zero corresponds to pattern 701, a 4×4 square of zero outputs, where zero is white and one is black. A constant input level of eight corresponds to pattern 709, which has eight elements on and the remainder off. Such a table unambiguously defines the output for each constant input. This may be useful when large areas of graphics are employed. However, other organizations may be more efficient for rapidly changing image data, such as from cameras and scanners.

FIG. 10B illustrates an output optimization of FIG. 10A according to one embodiment of the present invention in which one access yields eight pels of output assuming constant input values. In general, the idea is to gather rows of data together to provide more efficient cache access as the output is generated on a row-by-row basis. Specifically, in this example, two copies of each row are provided in each table entry. As a result, when constant input values are encountered, a single table lookup provides eight pels of output. If the input is not constant, the extra information can be masked off and ignored. Of course, with a larger matrix, it may not be convenient to store two copies of the output. For example, one row of a 32×32matrix would typically be stored as a 32-bit word rather than duplicating the data as depicted in FIG. 10B.

Figure 11A:
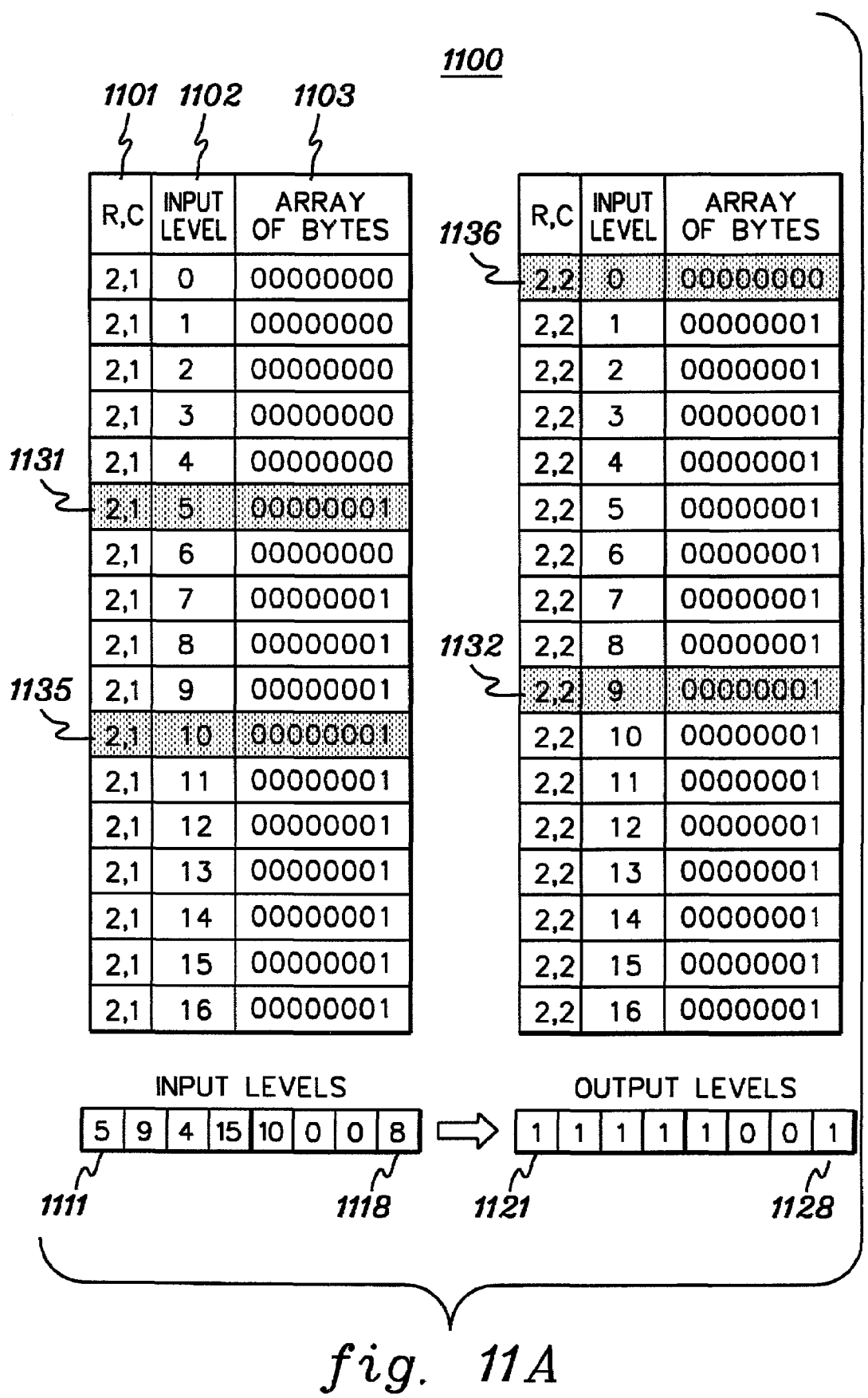

FIGS. 11A and 11B illustrate a table organized for more efficient output pel retrieval according to one embodiment of the present invention. In this example, for convenience, a threshold array 1100 has been derived based upon the patterns of FIG. 7. For each row and column (R,C) 1101 and each input level 1102, the threshold array 1100 includes an array of bytes 1103. According to the convention used by this example, the array of bytes 1103 includes a one in the least significant bit (LSB) (i.e., the right most bit) if the input level 1102 corresponds to a pel in the on state at the appropriate position (row 2, columns 1–4, in this example) in the corresponding basic pattern 701–717. For example, when the input pel sample corresponds to basic pattern 701 (e.g., the input level is 0), then row 2, column 1 represents an output pel in the off state and therefore the array of bytes is all zeroes. In contrast, when the input pel sample corresponds to basic pattern 706 (e.g., input level S), then row 2, column 1 represents an output pel in the on state and therefore the array of bytes has a one in the LSB.

It is contemplated that various other threshold array organizations may be employed. For example, rather than indexing the threshold array by (R,C) and input level, an alternative threshold organization would be to index the threshold array based upon three parameters: the input level, the x coordinate of the pel, and the y coordinate of the pel. For example, as mentioned above, according to one embodiment, the threshold array may be conceptually thought of as a three dimensional (3D) array indexed by u, v, and input intensity ; where u, and v are the x and y position in the input image modulo N and M (the dimensions of the supercell or the basic cell).

Figure 12:
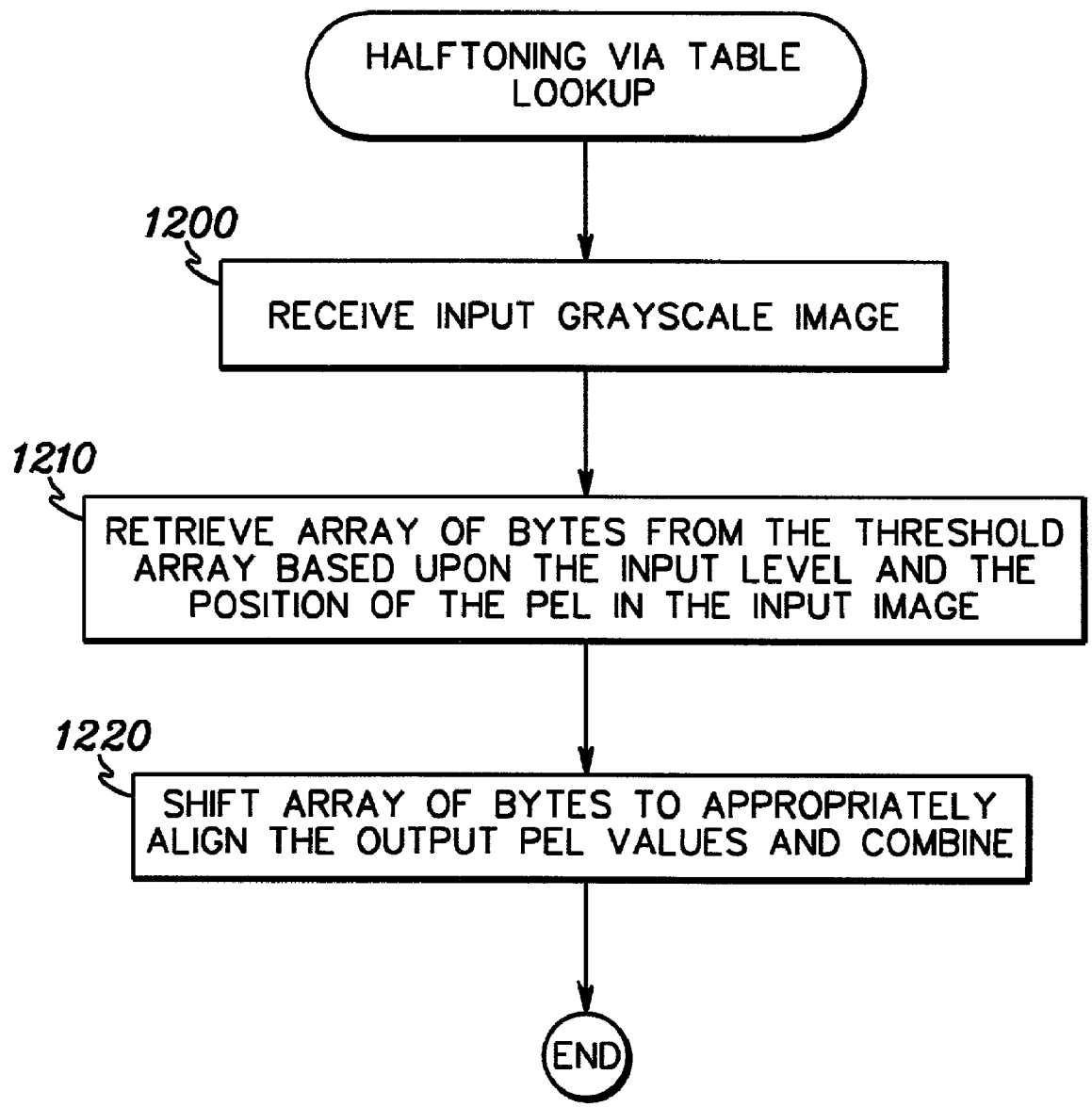
FIG. 12 is a flow diagram illustrating halftoning processing via table lookups according to another embodiment of the present invention.

FIG. 12 is a flow diagram illustrating halftoning processing via table lookups according to one embodiment of the present invention. At processing block 1200, an input image, such as input levels 1111–1118, is received. At processing block 1210, an array of bytes is retrieved from the threshold array 1100 based upon the input level of the current pel and the position of the pel in the input image. Then, at processing block 1220, the array of bytes retrieved is shifted to appropriately align the output pel value.

Referring back to FIGS. 11A and 11B, a concrete example of how an input sample is transformed into appropriate halftoned output values will now be described with reference to threshold array 1100 (specifically, threshold array entries 1131–1138), input levels 1111–1118, and output pels 1121–1128. In order to determine the output pel value for input level 1111, the byte from the array of bytes 1103 at entry 1131 is retrieved from threshold array 1100 and the LSB is shifted 7 bits to the left. Similarly, to determine the output pel value for input level 1112, the byte from the array of bytes 1103 at entry 1132 is retrieved and then shifted 6 bits to the left. The output pel value from input level 1113 is determined by retrieving entry 1133 and left shifting the LSB of the byte from the array of bytes 1103 by 5 bits. The upper nibble of output pels is completed with the LSB of the byte from the array of bytes 1103 corresponding to entry 1134 left shifted 4 bits. The lower nibble of output pels is similarly generated based upon entries 1135–1138 left shifted 3, 2, 1, and 0 bits respectively. Finally, the eight shifted bytes are combined to produce one output byte.

In an alternative embodiment, the one bit in the array of bytes 1103 may be positioned such that it is already in the appropriate position for the output pel vector if the output pel corresponds to the lower nibble of the output pel vector and can be adjusted for the upper nibble of the output pel vector by a constant shift.

Increased Number of Densities Per Basic Halftone Cell

As described above, in one aspect the present invention comprises a technique for enhancing the number of gray levels ( i.e. densities ) for a basic halftone cell. More particularly, the number of densities is increased to larger than n+1, where "n" is the number of dots within the basic halftone cell. The technique can also be used in conjunction with traditional methods of increasing the number of densities (such as supercell technology) to provide even larger numbers of densities.

An example of this aspect of the present invention is explained further below with reference to printing. However, those skilled in the art will understand that the concepts presented are equally applicable to any output device wherein output dots or spots partially overlap.

Most printers print a "dot" that is somewhat larger than, and shaped differently than a "perfect" rectangular or square pel within a basic cell array. Because of this, different placements of the same number of dots result in different amounts of overlap and hence different densities. FIG. 13 depicts a particular example of this effect. Each of the two drawings of FIG. 13 has a grid of sixteen squares, representing for example sixteen locations where a printer can place a printed dot. Each of the drawings has two adjacent circles, each of which is centered on a respective square. In one embodiment, the circles may represent dots actually printed by a printer. In both drawings, the dots have been printed in exactly two of the sixteen possible locations. Because the diagonally adjacent dots are spaced further apart than the horizontally adjacent dots, the overlap of these dots is reduced, thereby increasing the effective density of the cell without changing the number of printed dots. The present invention builds in part upon this aspect of overlapping dots.

Figure 14:
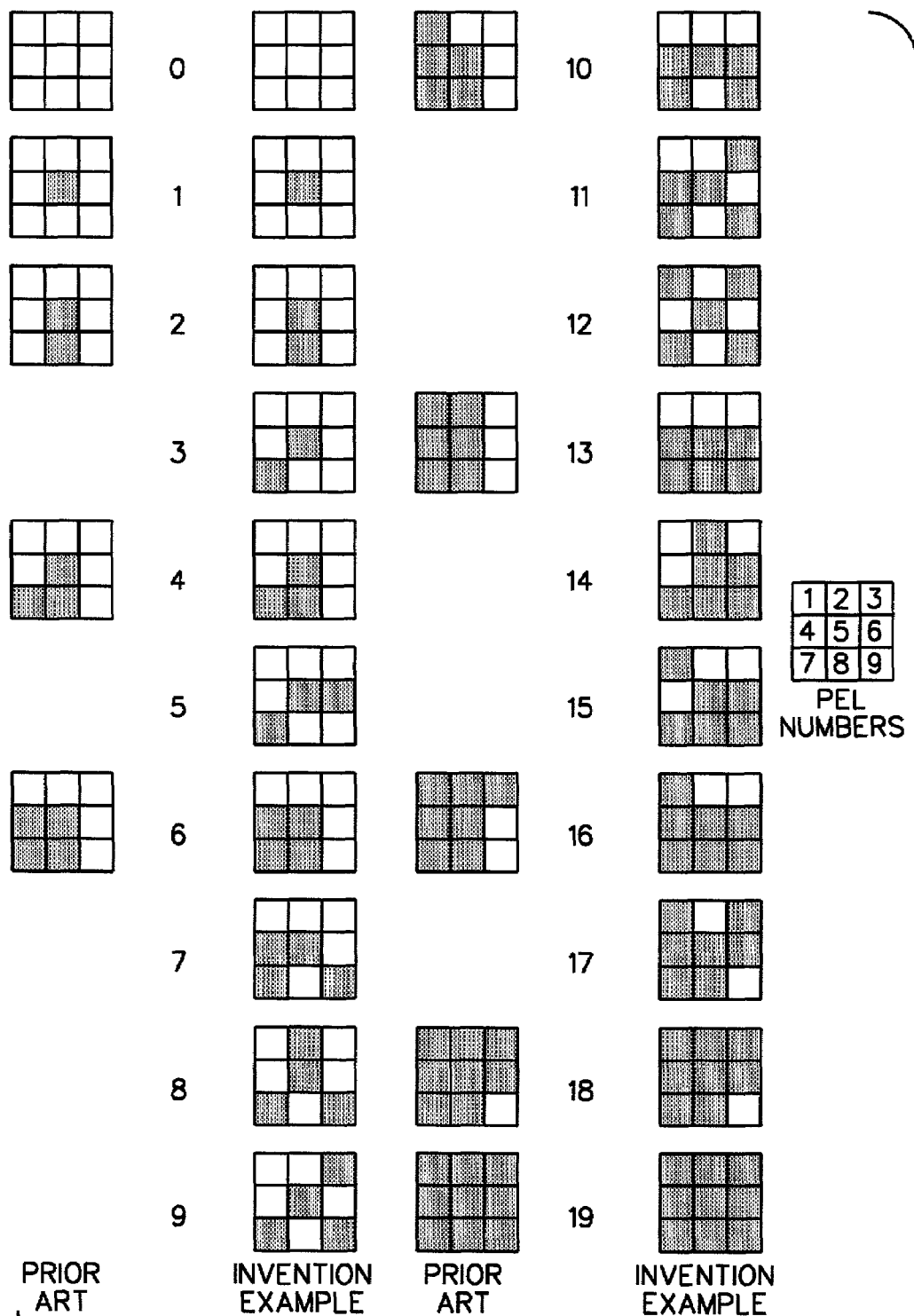
FIG. 14 illustrates for comparison basic cell pattern growth examples for a prior art approach and an approach in accordance with the present invention where a number of densities larger than n+1 is attained (where "n" is the number of possible dots within the basic halftone cell), for constant input.

FIG. 14 depicts one example of cell pattern growth in accordance with the present invention. In this example, a 3×3 array is depicted wherein cell growth in accordance with the invention results in nineteen densities, while the conventional series approach of turning on pels produces only ten (i.e., n+1). Thus, the flexible digital halftoning approach described herein results in an increased number of densities for a given basic cell. This is possible because the present invention allows one or more positions in the threshold matrix to make multiple transitions between on (e.g., printed with toner/ink) and off (e.g., not printed).

To restate, an increase in densities, for a constant input intensity, above n+1 for a given basic cell is achieved herein using the above-described point-wise thresholding technique for digital halftoning. This technique allows for the increase in densities output without having to consider values of neighboring pels or without losing resolution (i.e., without having the input resolution be much less than the output resolution) as required by the initially summarized prior art.

Those skilled in the art will note from the above discussion that the different patterns depicted in the invention example FIG. 14 have different densities notwithstanding a constant data input. This is due in part to the overlap in the dots aligned to the respective pels which are turned on. The amount of overlap is different when the dots are diagonally adjacent compared to when the dots are vertically or horizontally adjacent. Thus, notwithstanding that, for example, only two dots may be printed within a given basic cell, the density of the pattern will be different depending upon whether the dots are vertically or horizontally adjacent, or are diagonally adjacent (or are even separated).

Figure 15:
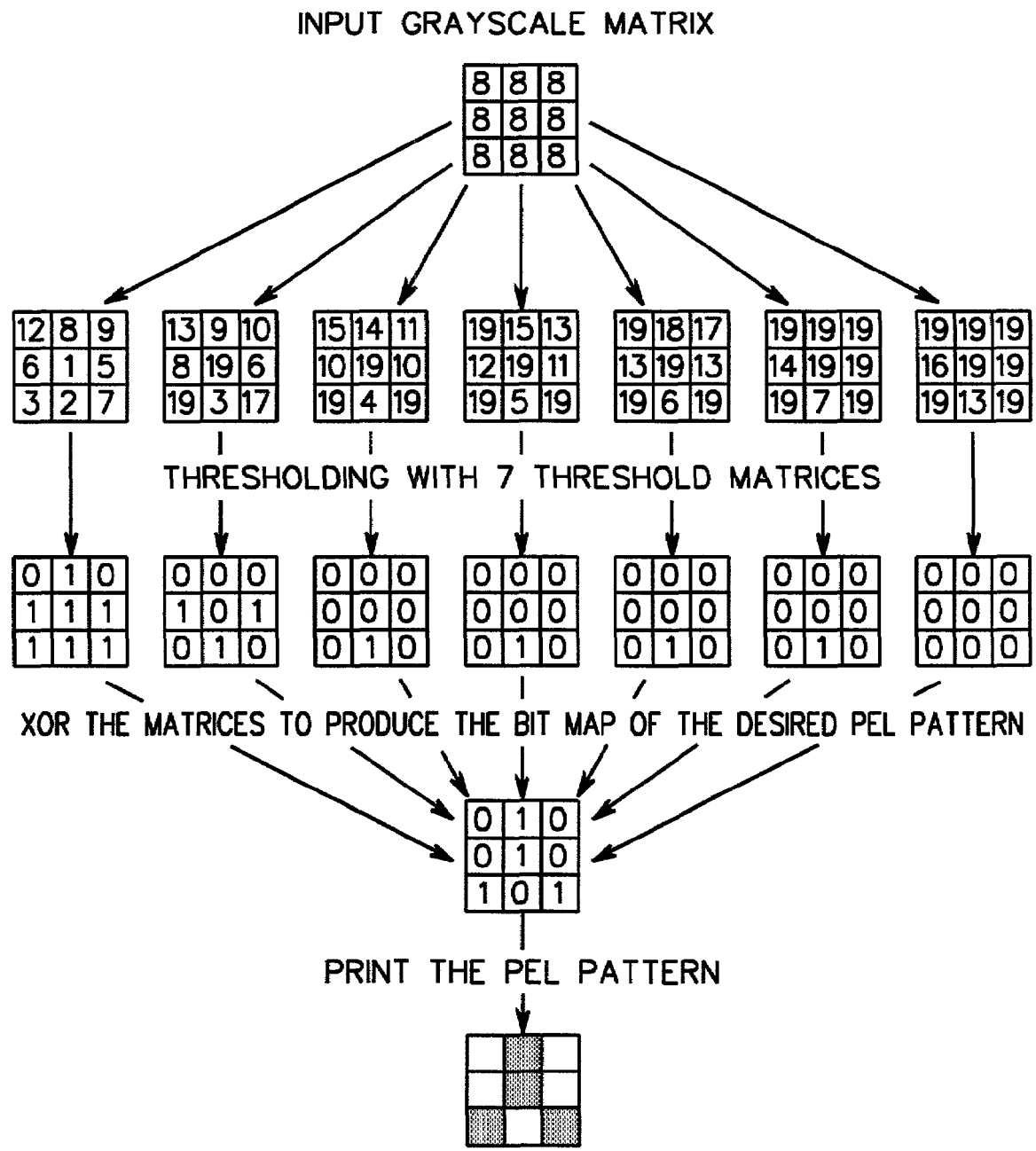
FIG. 15 conceptually illustrates how multiple threshold matrices can be employed to implement the basic cell pattern growth example of FIG. 14 in accordance with one embodiment of the present invention.

FIG. 15 depicts one example of how multiple threshold matrices can be employed to implement this aspect of the present invention. The input is assumed to comprise a constant input matrix and through thresholding with seven threshold matrices and the exclusive OR logic, a bit map of the desired pel pattern is achieved for printing. As described above, the threshold matrices can be fixed and downloaded into hardware. Alternatively, the matrices can be changeable to allow for varying of the pattern. The table implementations discussed above could alternatively be employed to achieve this aspect of the present invention, i.e., the increasing of the number of density at the output basic cell.

Although described above with reference to a bilevel printer, this aspect of the present invention is equally applicable to other types of output devices as well, such as multilevel printers, monochrome and color display devices, and the like.

For clarity of exposition, the increased number of densities per basic halftone cell has been described and calculated for constant input. It is obvious to those skilled in the art that this halftoning method and system providing increased number of densities per basic halftone cell for constant input can be used for non-constant input.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of halftoning comprising:

receiving input data comprising a first plurality of pels having a first plurality of intensities, wherein said first plurality of intensities (Iin) are chosen from K intensity levels;

converting the first plurality of pels having said first plurality of intensities into a second plurality of pels having a second plurality of intensities, wherein said second plurality of intensities (Iout) are chosen from L intensity levels, where L<K, and wherein the number of pels of the first plurality of pels is equal to the number of pels of the second plurality of pels;

wherein at least some pels of said second plurality of pels are grouped into at least one basic cell, each basic cell comprising n pels of said second plurality of pels; and wherein a maximum number of densities per each basic cell is greater than $(1+n\times(L-1))$ for a full range of constant input intensities (0 to K) (Iin), and each said intensity out (Iout) is chosen without reference to an intensity out of a neighboring pel and n pels of the first plurality of pels contribute to the output intensities of the n pels within each basic cell.

2. The method of claim 1, further comprising employing said second plurality of intensities (Iout) to place dots within each basic cell, wherein adjacent dots overlap within said basic cell.

3. The method of claim 2, further comprising producing said dots using a bilevel output device, wherein L=2.

4. The method of claim 2, further comprising producing said dots using a multilevel output device, wherein L>2.

5. The method of claim 2, further comprising producing said dots using a color output device, and wherein a subset of said second plurality of pels comprises one of multiple color components.

6. The method of claim 5, wherein said color output device comprises a bilevel output device, wherein L=2.

7. The method of claim 5, wherein said color output device comprises a multilevel output device, wherein L>2.

8. The method of claim 1, wherein said converting comprises point-wise thresholding using multiple threshold matrices to convert said first plurality of pels into said second plurality of pels without considering a neighboring pel.

9. The method of claim 8, wherein the multiple threshold matrices comprise a plurality of binary threshold matrices the outputs of which can be combined to produce an output image.

10. The method of claim 9, wherein the combination of outputs of the plurality of binary threshold matrices is accomplished with an exclusive OR operation.

11. A system for halftoning comprising:

means for receiving input data comprising a first plurality of pels having a first plurality of intensities, wherein said first plurality of intensities (Iin) are chosen from K intensity levels;

means for converting the first plurality of pels having said first plurality of intensities into a second plurality of pels having a second plurality of intensities, wherein said second plurality of intensities (Iout) are chosen from L intensity levels where L>K, and wherein the number of pels of the first plurality of pels is equal to the number of pels of the second plurality of pels;

wherein at least some pels of said second plurality of pels are grouped into at least one basic cell, each basic cell comprising n pels of said second plurality of pels; and wherein a maximum number of densities per each said basic cell is greater than $(1+n\times(L-1))$ for a full range of constant input intensities (0 to K) (Iin), and each said intensity out (Iout) is chosen without reference to an intensity out of a neighboring pel and n pels of the first plurality of pels contribute to the output intensities of the n pels within each basic cell.

12. The system of claim 11, further comprising means for employing said second plurality of intensities (Iout) to place dots within each basic cell, wherein adjacent dots overlap within said basic cell.

13. The system of claim 12, further comprising means for producing said dots using a bilevel output device, wherein L=2.

14. The system of claim 12, further comprising means for producing said dots using a multilevel output device, wherein L>2.

15. The system of claim 12, further comprising means for producing said dots using a color output device, and wherein a subset of said second plurality of pels comprises one of multiple color components.

16. The system of claim 15, wherein said color output device comprises one of a bilevel output device or a multilevel output device.

17. The system of claim 11, wherein said means for converting comprises means for point-wise thresholding using multiple threshold matrices to convert said first plurality of pels into said second plurality of pels without considering a neighboring pel.

18. A halftoning apparatus comprising:

at least one computing unit adapted to:

receive input data comprising a first plurality of pels having a first plurality of intensities, wherein said first plurality of intensities (Iin) are chosen from K intensity levels;

convert a first plurality of pels having said first plurality of intensities into a second plurality of pels having a second plurality of intensities, wherein said second plurality of intensities (Iout) are chosen from L intensity levels wherein L>K, and wherein the number of pels of the first plurality of pels is equal to the number of pels of the second plurality of pels;

wherein at least some pels of said second plurality of pels are grouped into at least one basic cell, each basic cell comprising n pels of said second plurality of pels; and wherein a maximum number of densities per each said basic cell is greater than $(1+n\times(L-1))$ for a full range of constant input intensities (0 to K) (Iin), and each said intensity out (Iout) is chosen without reference to an intensity out of a neighboring pel and n pels of the first plurality of pels contribute to the output intensities of the n pels within each basic cell.

19. A computer-readable medium having stored thereon data representing sequences of instructions, the sequences of instructions which, when executed by a processor, cause the processor to:

receive input data comprising a first plurality of pels having a first plurality of intensities, wherein said first plurality of intensities (Iin) are chosen from K intensity levels;

convert a first plurality of pels having said first plurality of intensities into a second plurality of pels having a second plurality of intensities, wherein said second plurality of intensities (Iout) are chosen from L intensity levels wherein L >K, and wherein the number of pels of the first plurality of pels is equal to the number of pels of the second plurality of pels;

wherein at least some pels of said second plurality of pels are grouped into at least one basic cell, each basic cell comprising n pels of said second plurality of pels; and wherein a maximum number of densities per each said basic cell is greater than $(1+n\times(L-1))$ for a full range of constant input intensities (0 to K) (Iin), and each said intensity out (Iout) is chosen without reference to an intensity out of a neighboring pel and n pels of the first plurality of pels contribute to the output intensities of n pels within each basic cell.

20. The computer-readable medium of claim 19, wherein the sequences of instructions further include instructions which, when executed by the processor, cause the processor to employ said second plurality of intensities (Iout) to place dots within each basic cell, wherein adjacent dots overlap within said basic cell.

21. The computer-readable medium of claim 20, wherein the sequences of instructions further include instructions which, when executed by the processor, cause the processor to produce said dots using a bilevel output device, wherein $L=2$.

22. The computer-readable medium of claim 20, wherein the sequences of instructions further include instructions which, when executed by the processor, cause the processor to produce said dots using a multilevel output device, wherein $L>2$.

23. The computer-readable medium of claim 19, wherein the sequences of instructions further include instructions which, when executed by the processor, cause the processor to implement point-wise thresholding using multiple threshold matrices to convert said first plurality of pels into said second plurality of pels without considering a neighboring pel.

* * * * *